United States Patent
Pahl (10) Patent No.: US 8,240,607 B2
(45) Date of Patent: Aug. 14, 2012

(54) AIRCRAFT-FUSELAGE ASSEMBLY CONCEPT

(75) Inventor: Günter Pahl, Hamburg (DE)

(73) Assignee: Airbus Operations GmbH (DE)

( * ) Notice: Subject to any disclaimer, the term of this patent is extended or adjusted under 35 U.S.C. 154(b) by 636 days.

(21) Appl. No.: 12/308,931

(22) PCT Filed: Jun. 28, 2006

(86) PCT No.: PCT/EP2006/006251
§ 371 (c)(1),
(2), (4) Date: Sep. 17, 2009

(87) PCT Pub. No.: WO2008/000286
PCT Pub. Date: Jan. 3, 2008

(65) Prior Publication Data
US 2010/0025531 A1    Feb. 4, 2010

(51) Int. Cl.
B64C 1/00 (2006.01)
(52) U.S. Cl. ............................................. 244/120
(58) Field of Classification Search .............. 244/125, 244/106, 117 R, 119, 118.2, 120
See application file for complete search history.

(56) References Cited

U.S. PATENT DOCUMENTS

| | | | |
|---|---|---|---|
| 1,541,976 A * | 6/1925 | Longren | ........................ 244/120 |
| 2,162,227 A | 6/1939 | Veit | |
| 3,405,893 A | 10/1968 | Flamand et al. | |
| 3,687,401 A | 8/1972 | Moore | |
| 5,395,072 A * | 3/1995 | Nelson | ............................. 244/36 |
| 5,542,626 A | 8/1996 | Beuck et al. | |
| 6,070,831 A | 6/2000 | Vassiliev et al. | |
| 6,123,295 A * | 9/2000 | Wexler et al. | .............. 244/172.3 |
| 6,237,210 B1 | 5/2001 | Stoewer et al. | |
| 6,408,517 B1 | 6/2002 | Lehmker et al. | |
| 7,735,779 B2 * | 6/2010 | Griess et al. | ................... 244/119 |
| 7,967,250 B2 * | 6/2011 | Lobato et al. | ................. 244/119 |
| 8,057,618 B2 * | 11/2011 | Hamlyn | ........................ 156/189 |
| 2002/0007548 A1 | 1/2002 | Stoewer et al. | |
| 2003/0057290 A1 | 3/2003 | Kornrumpf | |

FOREIGN PATENT DOCUMENTS

| | | |
|---|---|---|
| EP | 0976472 A2 | 2/2000 |
| EP | 1063166 A1 | 12/2000 |
| EP | 1293717 | 3/2003 |
| GB | 28704 | 0/1911 |
| JP | 03-248997 A | 11/1991 |
| JP | 2003094449 A | 4/2003 |
| RU | 2249537 C2 | 4/2005 |
| RU | 2301175 A | 4/2007 |
| RU | 67061 U1 | 10/2007 |

* cited by examiner

*Primary Examiner* — Richard Price, Jr.
(74) *Attorney, Agent, or Firm* — Lerner, David, Littenberg, Krumholz & Mentlik, LLP (57) ABSTRACT

An aircraft fuselage section includes a first interior tube as well as a second interior tube that are produced in an upstream production step, which interior tubes are subsequently enclosed by an exterior tube. For spacing and in order to provide more stability to the tubes the interior tubes are enclosed by straps that are arranged between the interior tubes and the exterior tube.

10 Claims, 8 Drawing Sheets

Fig. 19

AIRCRAFT-FUSELAGE ASSEMBLY CONCEPT

TECHNICAL FIELD

The present invention relates to the technical field of aircraft fuselage assembly. In particular, the invention relates to a fuselage section which, with the use of a novel assembly method, is essentially made of three tubes. Furthermore, the invention relates to a fuselage that has been joined from several fuselage sections according to the invention.

BACKGROUND TO THE INVENTION

Nowadays the assembly of modern aircraft fuselages usually takes place in that a plurality of vertical frames in longitudinal direction of a fuselage are connected to a plurality of horizontal stringers that are aligned, so as to be essentially perpendicular to said vertical frames, to form a skeleton, whereupon on the outside the individual exterior skin fields of the fuselage are riveted on or bonded on. In this process the fuselage is not produced in a continuous piece; instead, at first individual fuselage sections (also known as barrels or segments) are formed, which sections are subsequently joined to form a complete fuselage tube. To separate the passenger cabin from the cargo compartment located beneath it, in the individual segments on the frames a floor grid is attached. In this known type of fuselage assembly the fuselage is thus made from a large number of individual components (frames, stringers, exterior skin fields) in a complex assembly process, as a result of which considerable costs arise already during assembly of the fuselage.

Apart from these difficulties relating to production technology, there is a further disadvantage in that both the passenger cabin and the cargo compartment, due to the low air pressure at high altitudes, have to be pressurised during the flight. It is therefore necessary that in the case of decompression (drop in pressure) in the passenger compartment or cargo compartment, which decompression can, for example, be caused by damage to the exterior skin at high altitude, rapid pressure equalisation between these two spaces occurs, because otherwise the fuselage structure can be destroyed as a result of the pressure acting unilaterally on the floor grid, which floor grid is not designed to withstand such loads. In order to ensure pressure equalisation, pressure equalisation flaps are thus normally installed on the sides of the floor along the entire length of the fuselage, which pressure equalisation flaps are, however, associated with a further disadvantage in that in the case of an emergency landing on water, water enters the entire fuselage particularly quickly by way of this connection.

SUMMARY OF THE INVENTION

There may be a need to provide a fuselage design for an aircraft, which design is easier and more economical to implement as a result of an improved production process.

This need may be met with the aircraft fuselage section according to the invention, by a correspondingly formed fuselage, as well as by the production method according to the invention for a fuselage section.

Below, the fuselage section according to the invention is described, wherein the respective explanations analogously also apply to the fuselage according to the invention and to the production method, according to the invention, for a fuselage section.

Instead of producing the passenger cabin and the cargo compartment in the normal way, as is common in modern aircraft, in that fuselage barrels are merely divided into two regions by an intermediate floor, the present invention uses a totally different approach. The passenger cabin comprises or consists of a separate first tube while the cargo compartment comprises or consists of a separate second tube, wherein the two tubes are completely independent of each other. In an upstream or preliminary production process the two tubes can be produced entirely independently of each other as supporting shell constructions. In order to join the two separate tubes to form a uniform fuselage, these two tubes are enclosed by an exterior tube with which they are non-positively connected. The fuselage section according to the invention thus essentially comprises or consists of an accessible or walkable separate first prefabricated interior tube, and at least one accessible or walkable separate second prefabricated interior tube, which tubes are both enclosed by the exterior tube and are non-positively connected with this exterior tube. Since the interior tubes are two separate tubes, during an emergency landing on water they may not take up as quickly the water that is contained in one of the two tubes.

To this effect both the two interior tubes and the exterior tube can be designed as supporting shell constructions so that the loads experienced during flight have to be transferred essentially by way of the tubes themselves, rather than by way of the skeleton structure comprising frames or ribs and stringers, as is usual in the case of aircraft according to the state of the art.

While the material from which the tubes are made tends to be of secondary importance, fibre reinforced composite materials or metals, in particular aluminium, may however be suitable.

In order to provide additional stability to the interior tubes, and in order to space said interior tubes at a distance from the exterior tubes in the assembled state, the first interior tube can be enclosed by a first plurality of circumferential straps. Analogously, at least the second tube can also be enclosed by a second plurality of circumferential straps. In this arrangement the straps as well as the tubes themselves can, for example, be made from a fibre reinforced composite material or a metal such as for example aluminium. The form of the straps can for example be similar to that known from the frames in conventional aircraft construction, with a web-shaped cross section, extending radially from the interior tubes towards the exterior. The first plurality and the second plurality of circumferential straps for the two interior tubes can also be made in an upstream or preliminary production step and are dimensioned in such a way that for assembly they only have to be threaded (aufgefädelt) onto the two interior tubes before they are attached, spaced apart from each other, to the respective interior tube. For attachment, the straps can, for example, be bonded to or riveted to the tubes. Where both the tubes and the straps are made from metal they can also be welded to each other. The respective straps thus enclose the two interior tubes at regular spacing from each other so that in the assembled state of the interior tubes and the exterior tube the exterior tube is spaced apart from the interior tubes by the straps. In order to provide sufficient stability between the exterior tube and the interior tubes, they are interconnected by way of the straps, in that the straps are bonded, riveted, or, in the case of metal, firmly welded to the interior tubes and the exterior tube respectively.

The two interior tubes are two separate tubes whose cross sections correspond to the shape of a conventional passenger cabin and a conventional cargo compartment respectively. The first interior tube, for the passenger cabin, thus comprises a curved top circumferential region and a flat floor region, while the second interior tube, for the cargo compartment, comprises a curved bottom circumferential region as well as a flat ceiling region. The two tubes can thus be joined such that the flat ceiling regions or floor regions are facing each other so as to be spaced apart by the straps. In this intersection region, in which the floor of the first tube faces the ceiling of the second tube so as to be spaced apart by the respective straps, the individual straps of the first plurality of straps are alternately arranged so as to be offset in relation to the individual straps of the second plurality of straps so that in each case a strap of the second tube is located between two straps of the first tube. Of course it is also possible that there is more than just one second strap between two first straps, which can for example be the case in regions where the loads acting on the fuselage are particularly great. Instead of arranging the two strap groups so that they alternate in relation to each other, it is also possible to only use a type of strap of a shape that is essentially oval or circular, which by a chord-like strap is divided into two halves for accommodating the respective interior tubes.

In order to make assembly of the fuselage particularly simple and efficient the interior tubes and the straps that enclose them are produced in an upstream production step. Subsequently a first plurality of circumferential straps is threaded onto the first interior tube. Likewise a second plurality of circumferential straps is threaded onto the second interior tube. In order to be able to join the interior tubes comprising straps as set out above as precisely as possible in a specified position, the straps comprise suitable alignment tabs (Richtstege) that are arranged so as to position the first interior tube and the second interior tube in a specified position relative to each other. These alignment tabs can for example be provided at the ends of the horizontal strap regions that are arranged so as to be adjacent to the flat floor region or ceiling region of the first and second tubes respectively, so as to form a guide for the respective other tube when the two tubes are joined.

As already mentioned, the first interior tube forms a passenger cabin section, while the second interior tube forms a cargo compartment section, wherein these two sections are separated from each other by way of the intersection region of the straps (belts), which intersection region in this way forms a floor grid for the passenger cabin section. The two interior tubes are thus two tubes that are completely separated from each other, which tubes are only interconnected (for example riveted or bonded to each other), by the straps, in the intersection region of the straps. The floor grid formed by the straps is dimensioned in such a way that it can also absorb unilateral pressure that may for example be experienced as a result of a drop in pressure in one of the two interior tubes.

In order to provide the fuselage section according to the invention with an add-on piece, such as for example a vertical tail unit, a tubular adapter jacket can be joined between the at least two joined interior tubes and the exterior tube, which adapter jacket comprises a connecting piece that is designed so that a vertical tail unit can be attached to it. In this arrangement the connecting piece projects to the outside by a corresponding recess in the exterior tube, so that a vertical tail unit can be attached to it. The adapter jacket itself surrounds the two joined interior tubes, so as to be able to safely transfer the loads from the vertical tail unit into the fuselage.

According to a further aspect of the present invention, the object of the invention may be met by a fuselage that comprises at least two fuselage sections as described above. For this purpose the respective face areas of the individual fuselage sections comprise suitable connecting pieces by which the individual sections can be connected to form a uniform or integral fuselage.

As can be seen from the above explanations, contrary to the usual practice of producing a fuselage from a single large structural exterior tube made of ribs, stringers and an exterior skin field, it may thus be a basic principle of the present invention to construct the fuselage from two separate interior tubes that are enclosed by an exterior tube, wherein each tube can be designed as a supporting (stressed) shell construction so as to, in the combination of the three tubes, contribute to the load transfer (Lastabtragung) according to its stiffness.

According to a further aspect of the present invention the object of the invention may be met by a method for producing a fuselage section, which method may be carried out in several individual steps, wherein some of the individual steps can be carried out in varying order. First, an interior tube and at least one second interior tube are produced as supporting shell constructions. The first interior tube can serve as a passenger cabin while the second interior tube can serve as a cargo compartment. The first interior tube can thus comprise a curved upper circumferential region and a flat floor region. Correspondingly, the second interior tube can comprise a curved bottom circumferential region and a flat ceiling region. Subsequently the two prefabricated interior tubes can be joined to form a combination tube, wherein the first floor region of the first interior tube comes to rest against the flat ceiling region of the second interior tube. Subsequently, the combination tube that has been produced in this way can be enclosed by an exterior tube and can be joined to said exterior tube, for example by bonding, riveting or welding, so as to form a fuselage section.

Instead of implementing the method in the way described, the individual steps can also be reversed so that, for example, first the exterior tube is produced, in which thereafter the two separate interior tubes can be produced and connected to the exterior tube. For production technology reasons it is however advantageous to first prefabricate the two interior tubes and the exterior tube in an upstream production step, and subsequently to join the two interior tubes so that they form the above-mentioned combination tube, which is then simply inserted into the already prefabricated exterior tube and is connected to said exterior tube.

In order to improve the stability of the two interior tubes and of the exterior tube, the first prefabricated interior tube can be enclosed by a first plurality of circumferential straps. Likewise at least the second prefabricated interior tube can be enclosed by a second plurality of circumferential straps. In this arrangement the straps for the first and the second interior tubes can also have been produced in an upstream production step, or they can subsequently be produced to a precise fit around the first and second interior tubes. In the case where the individual straps of the first plurality of straps and the individual straps of the second plurality of straps have been prefabricated to provide a precise fit for the respective tubes, the individual straps can simply be threaded and slid onto the respective prefabricated tubes in order to then be riveted, bonded or welded onto the respective interior tubes.

To prevent the individual straps of the first plurality of straps and of the second plurality of straps from impeding each other when the two interior tubes are joined to form a combination tube, the individual straps of the first plurality of straps and the individual straps of the second plurality of straps are positioned on the at least two interior tubes such that the individual straps of the first and the second plurality of straps in the joined state of the tubes in an intersection region are alternately offset in relation to each other.

In order to improve the stability of the fuselage section that comprises or is comprised of the outer tube and the inner tubes, the first and the second plurality of straps are non-positively connected to the exterior tube, after the combination tube has been inserted into the exterior tube. Such a non-positive connection can ensure that structural loads do not have to be transferred by the exterior tube alone, but instead that such loads are transferred over the entire fuselage structure, including the straps and the interior tubes.

BRIEF DESCRIPTION OF THE DRAWINGS

Below, the present invention is described in more detail with reference to a purely exemplary embodiment that is explained in more detail with reference to the following drawings, as follows:

FIGS. 2a to 4 show various production states of a front fuselage section;

FIGS. 5a to 8 show various production states of a middle fuselage section;

FIGS. 9a to 17 show various production states of a rear fuselage section;

Identical or similar components in different figures have the same reference signs.

DESCRIPTION OF THE EXEMPLARY
EMBODIMENT OF THE INVENTION

Figure 1:
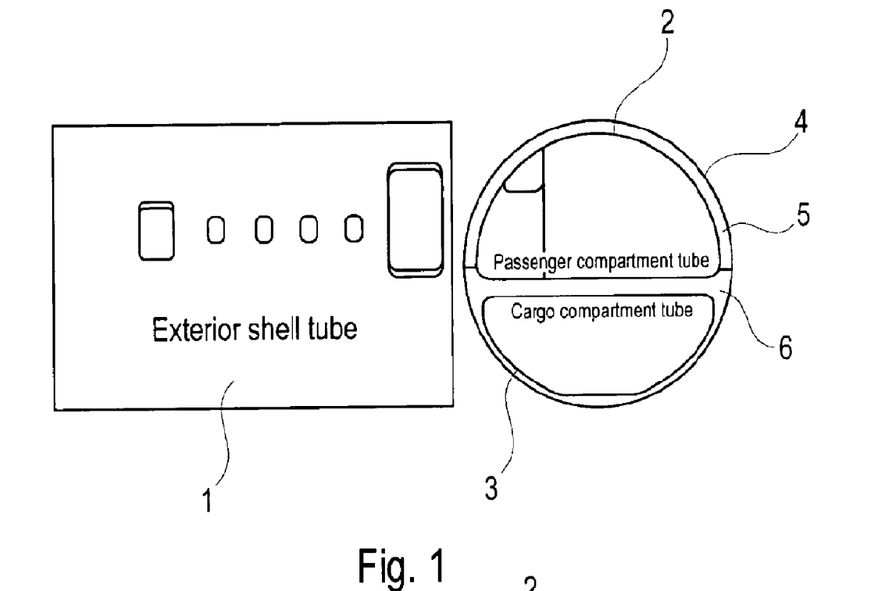
FIG. 1 shows a projection and a cross section of a fuselage section according to the invention.

FIG. 1, and in particular the right-hand diagram, shows a basic principle of the invention, according to which the fuselage section 1 according to the invention essentially comprises or consist of three different tubes 2, 3, 4 that are produced in separate steps and are joined only during final assembly of the fuselage. The fuselage section 1 thus comprises or consist of an exterior tube 4 that encloses the two interior tubes 2 and 3 that have been fitted into it, as shown in the right-hand diagram of FIG. 1. In this arrangement the first interior tube 2 forms a passenger cabin section while the second interior tube 3 forms a corresponding cargo compartment section. As shown in the right-hand diagram of FIG. 1 the two interior tubes 2 and 3 are arranged in the interior of the exterior tube so as to be spaced apart from each other, wherein the flat floor region of the first tube extends essentially in parallel to the flat ceiling region of the second tube 3. Spacing apart the two interior tubes 2, 3 and spacing them apart from the exterior tube 4 is ensured by a plurality of straps 5, 6 which enclose the first interior tube 2 and the second interior tube 3 alternately and offset in relation to each other, as is clearly shown, for example in the right-hand diagram of FIG. 4. In their final state the straps 5, 6 are firmly connected to the two interior tubes 2, 3 and to the exterior tube 4, wherein such connection can for example be established by welding, bonding or riveting.

Below, the assembly of various fuselage sections is explained with reference to the other figures.

Figure 2A:
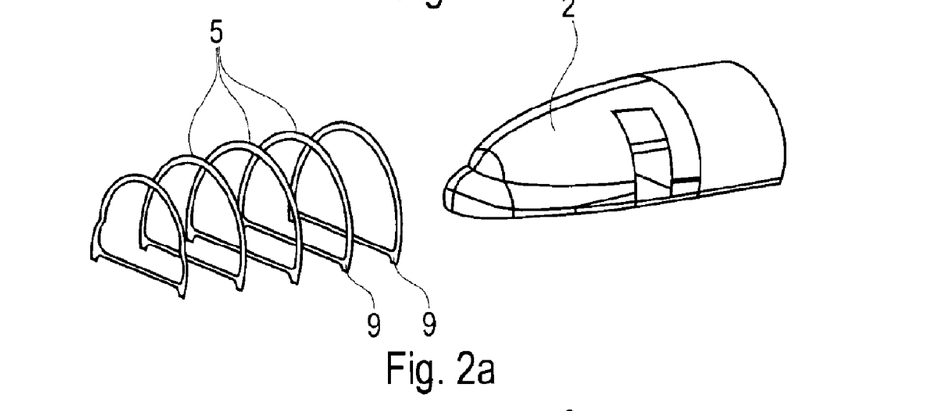

The left-hand view of FIG. 2a shows a plurality of prefabricated straps 5, whose form matches the exterior contour of the prefabricated first interior tube 2. Correspondingly, FIG. 2b shows a second plurality of prefabricated straps 6, whose form also matches the exterior contour of the second interior tube 3.

Figure 2B:
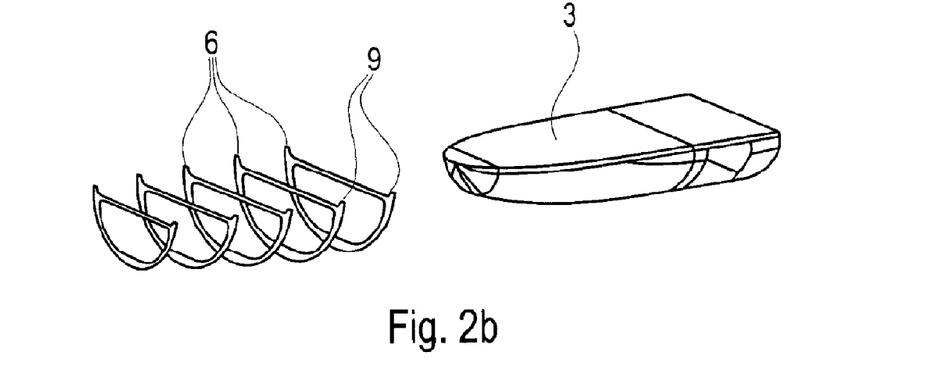
Figure 3A:
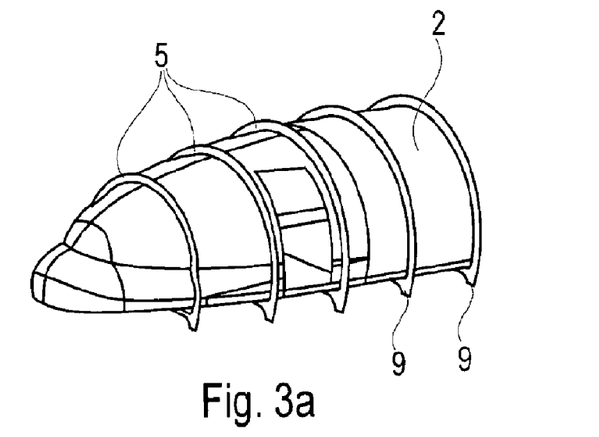
Figure 3B:
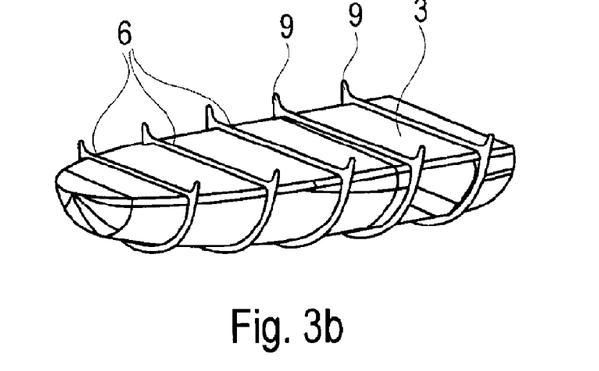

FIGS. 3a and 3b show the production states that follow the prefabrication state shown in FIGS. 2a and 2b. In this arrangement the individual straps 5 and 6 have already been threaded and slid onto the associated interior tubes 2 and 3 and have then been firmly joined to the interior tubes, for example by bonding, riveting or, in the case where the straps 5, 6 and the interior tubes 2, 3 are made from metal (for example aluminium) by joining the points (verfugen) or welding.

Figure 4:
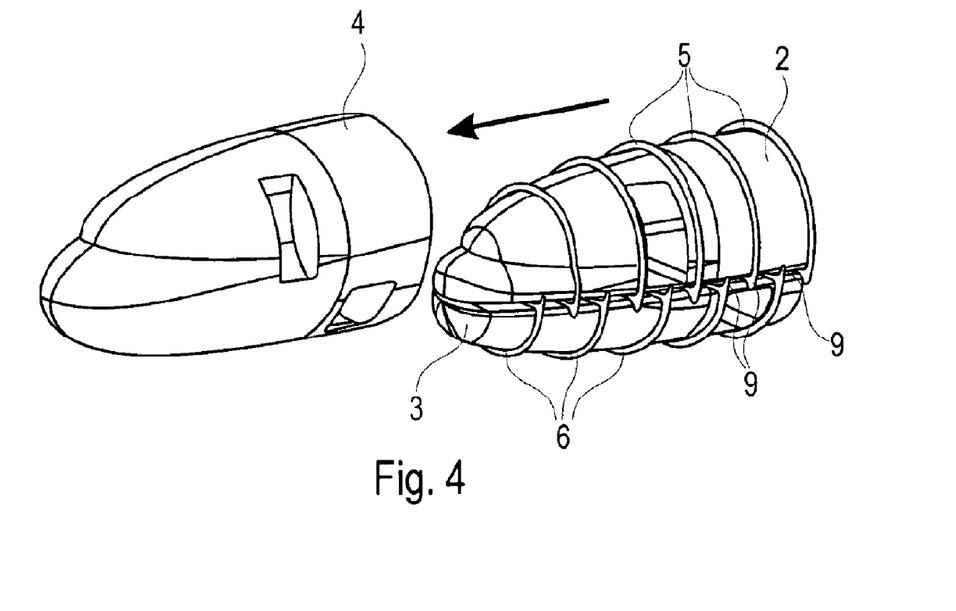

In a subsequent production step the first interior tube 2 and the second interior tube 3 are brought together to form a combination tube, as shown in the right-hand diagram of FIG. 4. As shown in this diagram the straps 5 and 6 in the assembled state of the interior tubes 2, 3 are arranged so as to be offset in relation to each other and forming, below the floor of the interior tube 2, the floor grid for the first tube 2. In order to provide positioning safeguards for the assembly of the first interior tube 2 and of the second interior tube 3, the straps 5, 6, on their respective ends of their straight regions, comprise alignment tabs 9 that extend in the direction of the respective other tube 3, 2 in order to safeguard in this way the position of said tube in the assembled state. The combination tube produced in this way can finally be inserted into the exterior tube 4 as indicated by the arrow in FIG. 4, and subsequently said combination tube can be welded, bonded or riveted to said exterior tube 4.

Figure 5A:
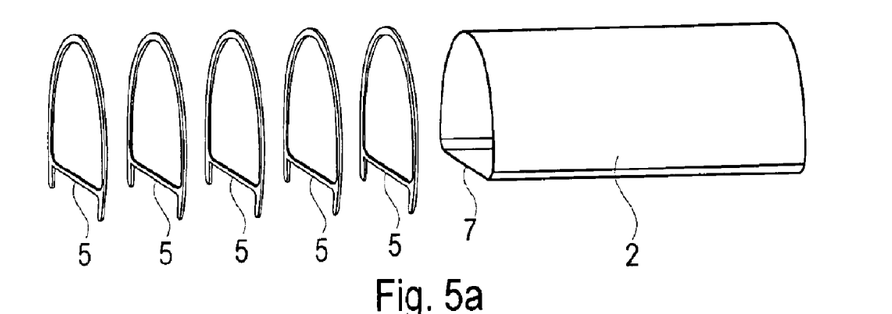
Figure 5B:
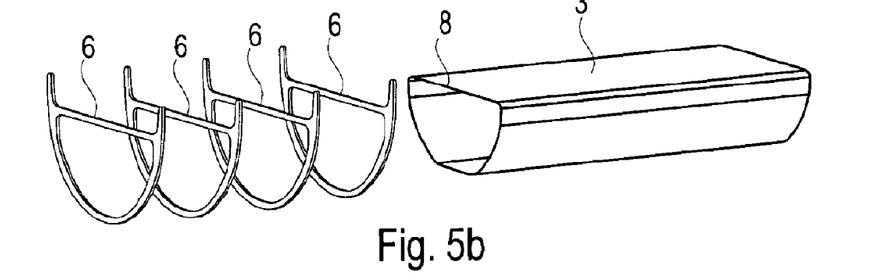
Figure 6A:
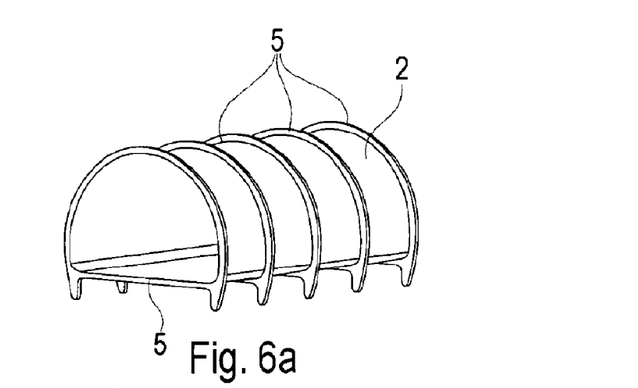
Figure 6B:
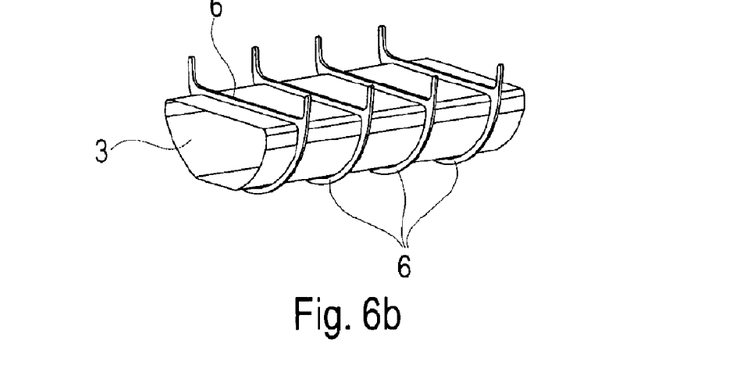
Figure 7:
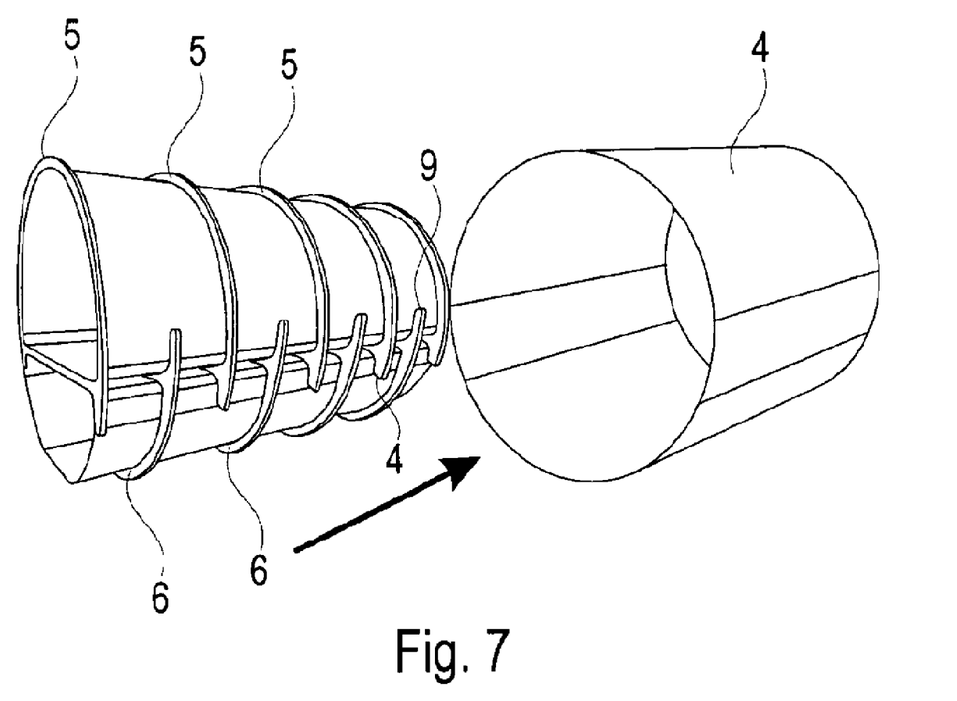
Figure 8:
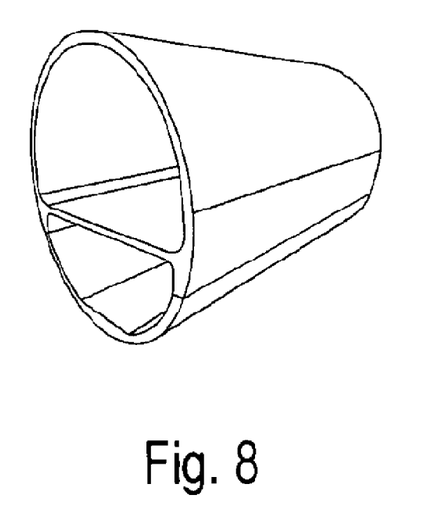
Figure 9A:
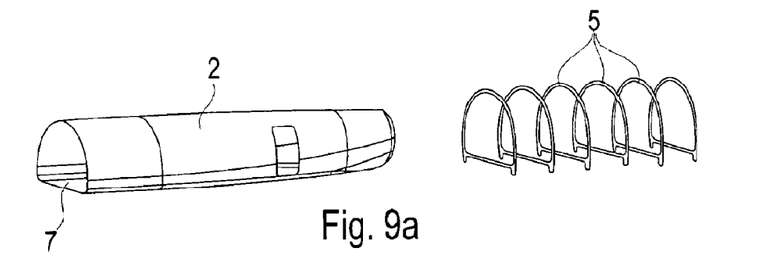
Figure 9B:
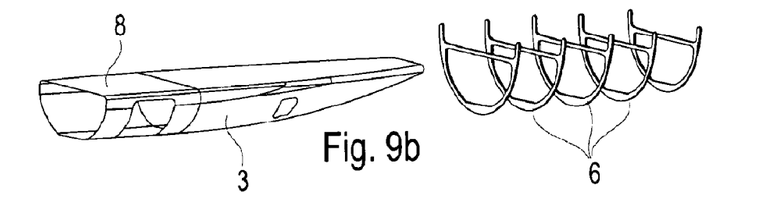
Figure 10A:
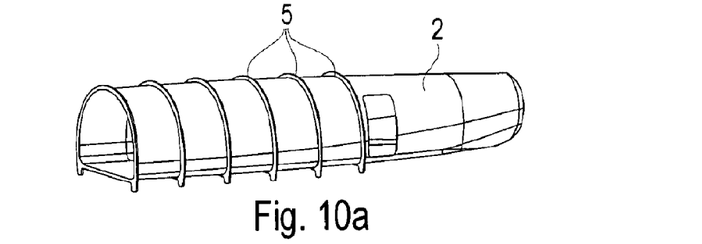
Figure 10B:
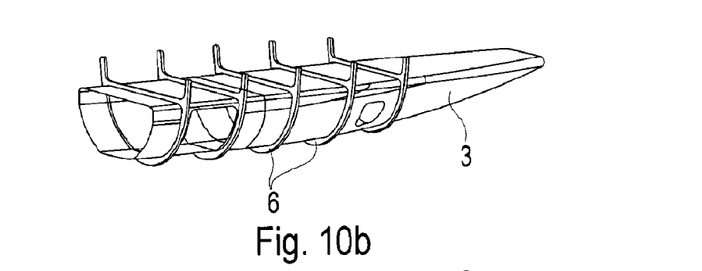

Below, with reference to FIGS. 5a to 8, the assembly of a middle fuselage section is described, wherein, however, the respective assembly states essentially correspond to the previously described ones. FIGS. 5a and 5b in turn show a first plurality 5 of straps and a second plurality 6 of straps, whose contours again match the outside contours of the respective interior tubes 2 and 3 so that the first and the second plurality of straps can be threaded onto and slid onto the prefabricated tubes 2, 3, as is shown in FIGS. 6a and 6b. Subsequently, the interior tubes 2 and 3 that comprise straps 5 and 6 in this way are joined as shown in the left-hand diagram of FIG. 7 so that the flat floor region 7 of the first interior tube 2 extends so as to be essentially parallel in relation to the flat ceiling region 8 of the second tube 3. As this diagram also shows, the alignment tabs 9 optimally align the two joined interior tubes 2, 3 in relation to each other, and furthermore ensure that the two interior tubes 2, 3 cannot be laterally displaced in relation to each other. The combination tube produced in this way is then again inserted into a prefabricated exterior tube 4, as indicated by the arrow in FIG. 7, so as to be finally non-positively connected to said exterior tube 4.

Figure 11:
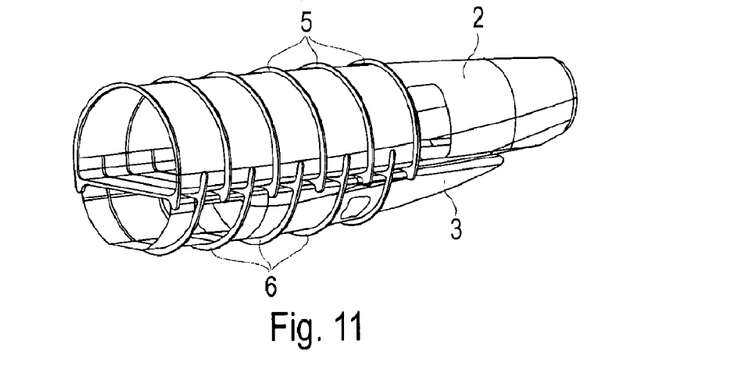
Figure 12:
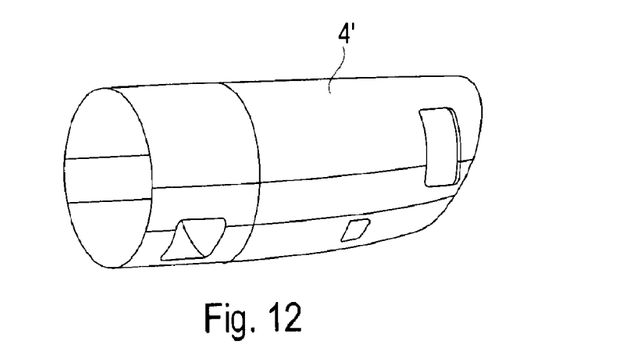
Figure 13:
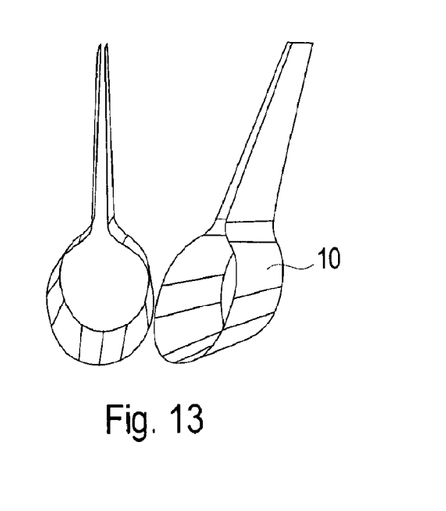
Figure 14:
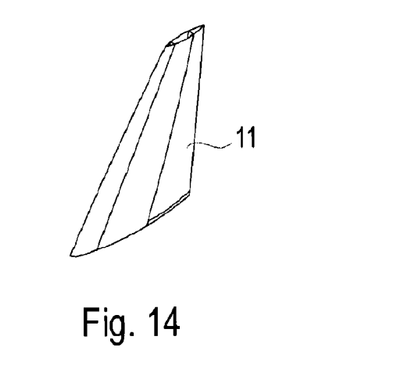
Figure 15:
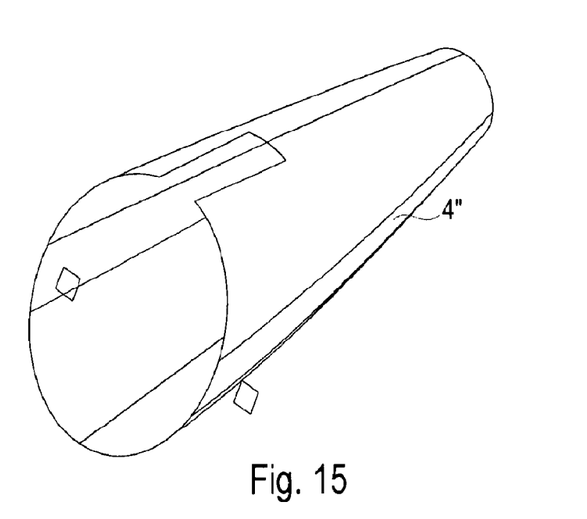

Below, the installation of a further fuselage section is described, in which as a special feature the installation of an integrated vertical tail unit is added. First, again, a first or second plurality 5, 6 of straps are slid onto correspondingly prefabricated interior tubes 2, 3 as shown in FIGS. 9a to 10b. Here again the individual straps of the first and the second plurality 5, 6 of straps are arranged so as to be essentially offset in relation to each other so that the two interior tubes 2, 3 can be joined to form a combination tube as shown in FIG. 11. In a further step the front exterior tube 4' shown in FIG. 12 is slid from the front onto the combination tube produced in this way. To attach a vertical tail unit 11 (FIG. 14) the adapter jacket 10 shown in FIG. 13 is slid from behind onto the combination tube, the top of which adapter jacket 10 comprises a connecting piece onto which the vertical tail unit 11 can for example be clipped or screwed. As soon as the adapter jacket 10 has been attached to the combination tube of FIG. 11 as prescribed, from the rear a further exterior tube 4" can be slid onto the combination tube 2, 3 of FIG. 11, the top of which combination tube 2, 3 comprises a recess for the connecting piece of the adapter jacket 10 (FIG. 15).

Figure 16:
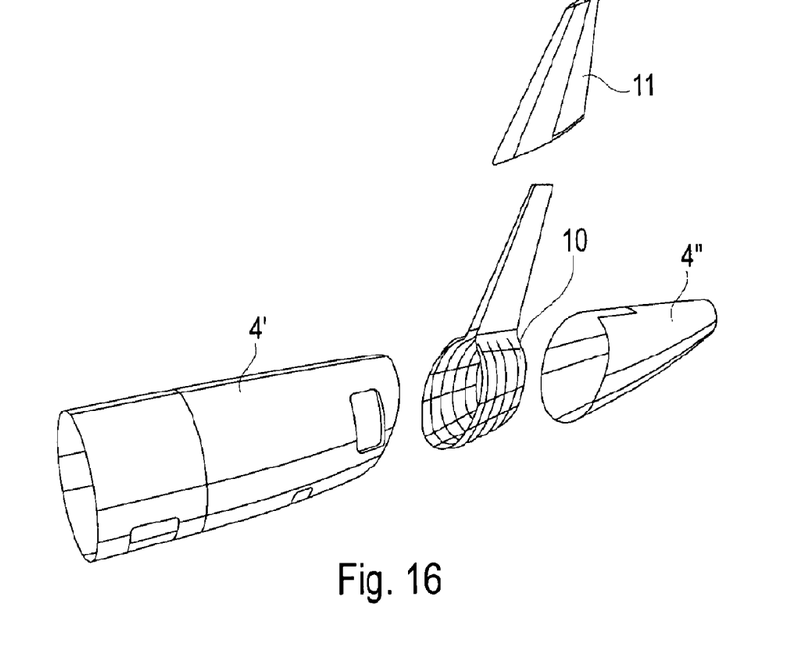
Figure 17:
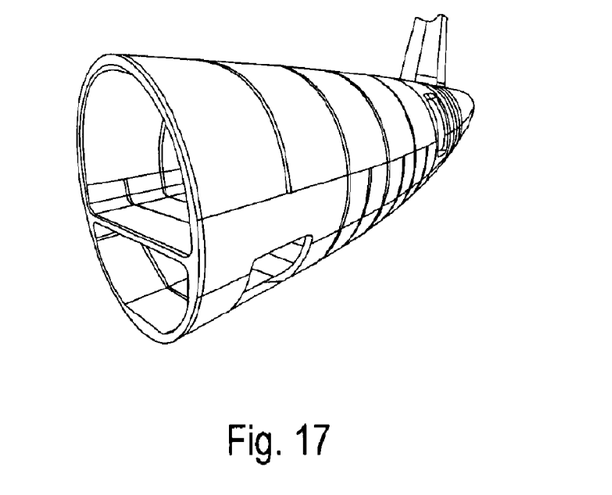

For the sake of clarity the last installation step and/or the assembly of the individual components is again shown in the exploded view of FIG. 16, which again clearly shows the allocation of the individual components.

Figure 18:
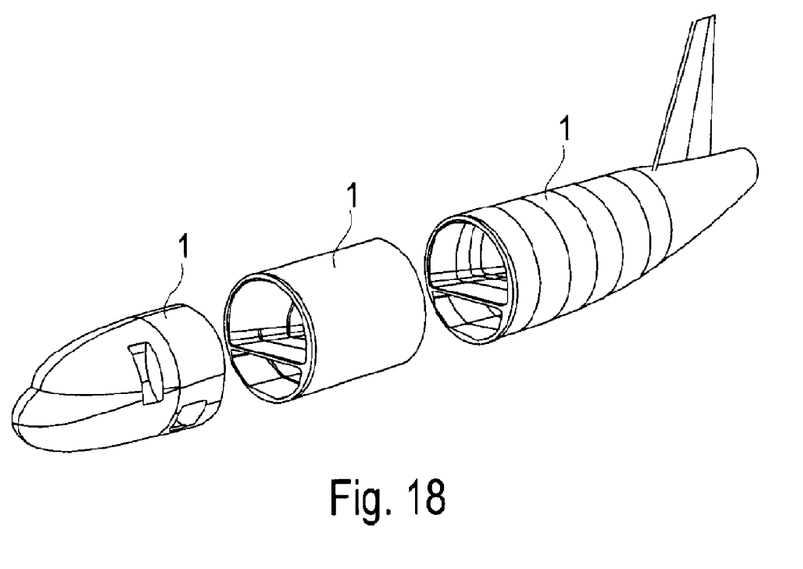
FIG. 18 shows an exploded view of a fuselage, comprising or comprised of three fuselage sections, prior to final assembly.
Figure 19:
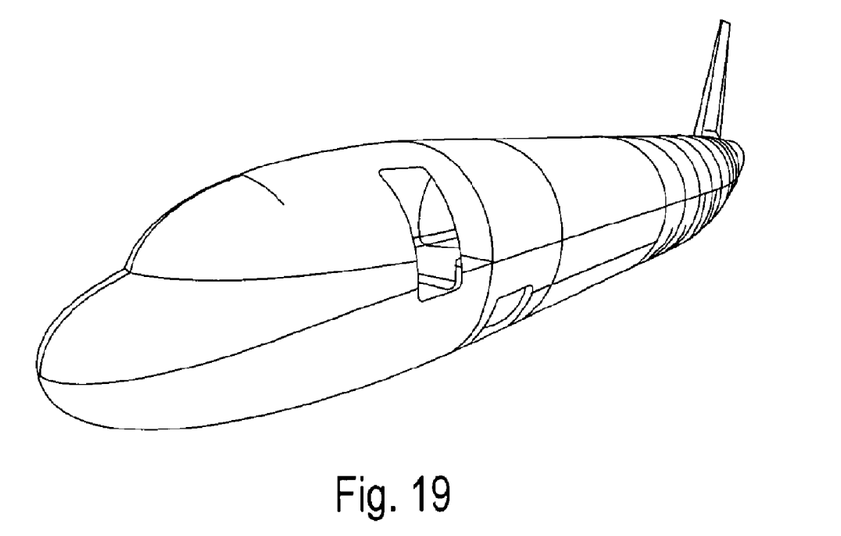
FIG. 19 shows the three fuselage sections of FIG. 18 in the assembled state.

FIG. 18 finally shows the assembly of the three previously described fuselage sections 1 in which the three sections 1 are arranged face to face in relation to each other so that subsequently they are interconnected by suitable attachment elements and connection elements so as to form a uniform fuselage as shown in FIG. 19.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

LIST OF REFERENCE CHARACTERS

1 Fuselage section
2 First interior tube
3 Second interior tube
4 Exterior tube
5 Straps of the first plurality of straps
6 Straps of the second plurality of straps
7 Flat floor region
8 Flat ceiling region
9 Alignment tab
10 Adapter jacket
11 Vertical tail unit

The invention claimed is:

1. A fuselage section, comprising:
an accessible first interior tube;
at least one accessible second interior tube;
an exterior tube; and
a first plurality of circumferential straps and a second plurality of circumferential straps,
wherein the first interior tube and the second interior tube are enclosed by the exterior tube and are non-positively connected to the exterior tube,
wherein the first interior tube is enclosed by the first plurality of circumferential straps, and the at least one second interior tube is enclosed by the second plurality of circumferential straps, and
wherein the first and the second plurality of straps are non-positively connected to the exterior tube.

2. The fuselage section of claim 1, wherein the individual straps of the first plurality of straps in an intersecting region are alternately arranged so as to be offset in relation to the individual straps of the second plurality of straps.

3. The fuselage section of claim 2, wherein the straps of at least one of the first and second plurality of straps comprise alignment tabs that are arranged so as to position the first interior tube and the second interior tube in a defined position one above the other.

4. The fuselage section of claim 2, wherein the first interior tube is formed as a passenger cabin section, while the second interior tube is formed as a cargo compartment section, wherein the passenger cabin and cargo compartment sections are separated from each other by way of the intersection region of the straps, which intersection region forms a floor grid for the passenger cabin section.

5. The fuselage section of claim 1, further comprising a tubular adapter jacket which is inserted between the two joined interior tubes and the exterior tube and which comprises a connecting piece that is adapted for a vertical tail unit to be attached to it.

6. A fuselage comprising at least two fuselage sections,
wherein at least one first fuselage section and a second fuselage section each comprise:
an accessible first interior tube;
at least one accessible second interior tube;
an exterior tube; and
a first plurality of circumferential straps and a second plurality of circumferential straps,
wherein the first interior tube and the second interior tube are enclosed by the exterior tube and are non-positively connected to the exterior tube,
wherein the first interior tube is enclosed by the first plurality of circumferential straps, and the at least one second interior tube is enclosed by the second plurality of circumferential straps, and
wherein the first and the second plurality of straps are non-positively connected to the exterior tube and
wherein the at least two fuselage sections comprise respective face areas that are designed to join the at least two fuselage sections to form a uniform fuselage.

7. A method for producing a fuselage section comprising:
producing at least one first interior tube;
producing at least one second interior tube;
joining the at least two interior tubes to form a combination tube;
enclosing the combination tube with an exterior tube; and
joining the exterior tube to the combination tube,
wherein the first prefabricated interior tube is enclosed by a first plurality of circumferential straps, and wherein the at least one second interior tube is enclosed by a second plurality of circumferential straps.

8. The method of claim 7, wherein the individual straps of the first plurality of straps and the individual straps of the second plurality of straps are prefabricated and slid onto the respective prefabricated interior tubes.

9. The method of claim 7, wherein the individual straps of the first plurality of straps and the individual straps of the second plurality of straps are positioned on the at least two interior tubes such that the individual straps of the first and second plurality of straps in the joined state of the interior tubes in an intersection region are arranged so as to be alternately offset in relation to each other.

10. The method of claim 7, wherein the first and the second plurality of straps are non-positively connected to the exterior tube, after the combination tube has been inserted into the exterior tube.

* * * * *

UNITED STATES PATENT AND TRADEMARK OFFICE
CERTIFICATE OF CORRECTION

| | | |
|---|---|---|
| PATENT NO. | : 8,240,607 B2 | Page 1 of 1 |
| APPLICATION NO. | : 12/308931 | |
| DATED | : August 14, 2012 | |
| INVENTOR(S) | : Günter Pahl | |

It is certified that error appears in the above-identified patent and that said Letters Patent is hereby corrected as shown below:

In the Claims

Claim 5, Column 8, Line 7 "which is" following the word jacket should be deleted.

Signed and Sealed this
Twenty-third Day of September, 2014

Michelle K. Lee
*Deputy Director of the United States Patent and Trademark Office*